US011887466B2

(12) United States Patent
Trotto

(10) Patent No.: US 11,887,466 B2
(45) Date of Patent: Jan. 30, 2024

(54) CUSTOMIZING ALGORITHMS BASED ON DEVICE MOUNTING ORIENTATION

(71) Applicant: Carrier Corporation, Palm Beach Gardens, FL (US)

(72) Inventor: Frank Trotto, Peyton, CO (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/950,629

(22) Filed: Sep. 22, 2022

(65) Prior Publication Data

US 2023/0093815 A1 Mar. 30, 2023

Related U.S. Application Data

(60) Provisional application No. 63/272,238, filed on Oct. 27, 2021, provisional application No. 63/247,901, filed on Sep. 24, 2021.

(51) Int. Cl.

| | |
|---|---|
| ***G08B 29/00*** | (2006.01) |
| ***G08B 29/18*** | (2006.01) |
| ***G08B 17/10*** | (2006.01) |
| ***G08B 29/14*** | (2006.01) |

(52) U.S. Cl.

CPC ........... *G08B 29/186* (2013.01); *G08B 17/10* (2013.01); *G08B 29/145* (2013.01)

(58) Field of Classification Search

CPC .... G08B 29/186; G08B 17/10; G08B 29/145; G08B 29/185

See application file for complete search history.

(56) References Cited

U.S. PATENT DOCUMENTS

| | | | | |
|---|---|---|---|---|
| 5,546,074 | A | 8/1996 | Bernal et al. | |
| 8,253,574 | B2 | 8/2012 | Li et al. | |
| 10,210,733 | B1 * | 2/2019 | Norris | G08B 17/10 |
| 10,970,985 | B2 | 4/2021 | Antar et al. | |
| 10,991,213 | B2 | 4/2021 | Sloo et al. | |
| 2008/0180258 | A1 * | 7/2008 | Lang | G08B 17/00 340/584 |
| 2012/0126975 | A1 * | 5/2012 | Gonzales | G08B 29/26 340/540 |
| 2018/0102858 | A1 * | 4/2018 | Tiwari | G06Q 10/04 |
| 2018/0121571 | A1 * | 5/2018 | Tiwari | G06F 30/13 |
| 2020/0402381 | A1 * | 12/2020 | Nelson | G08B 7/06 |

(Continued)

FOREIGN PATENT DOCUMENTS

| | | | |
|---|---|---|---|
| CN | 111613037 | A | 9/2020 |
| JP | 2013003759 | A | 1/2013 |
| JP | 2013003760 | A | 1/2013 |

OTHER PUBLICATIONS

System Sensor, "System Smoke Detectors", Applications Guide, 2021, 20 pages.

(Continued)

*Primary Examiner* — Ojiako K Nwugo

(74) *Attorney, Agent, or Firm* — CANTOR COLBURN LLP

(57) ABSTRACT

A system and method for selecting an algorithm for monitoring alarm conditions based on a detector orientation and position. A method may include determining a position and orientation of a smoke detector, selecting an algorithm for performing detection of an alarm condition, and operating the smoke detector using the selected algorithm.

16 Claims, 3 Drawing Sheets

(56) References Cited

U.S. PATENT DOCUMENTS

| | | | |
|---|---|---|---|
| 2021/0026927 A1 | 1/2021 | Daly et al. | |
| 2021/0027612 A1 | 1/2021 | Daly et al. | |
| 2021/0042522 A1* | 2/2021 | Dias Bispo Carvalho | G06T 7/70 |

OTHER PUBLICATIONS

European Search Report for Application No. 22196854.8; dated Feb. 17, 2023; 10 pages.

* cited by examiner

CUSTOMIZING ALGORITHMS BASED ON DEVICE MOUNTING ORIENTATION

CROSS-REFERENCE TO RELATED APPLICATIONS

This application claims the benefit of Provisional Application Nos. 63/247,901 filed Sep. 24, 2021, and 63/272,238 filed Oct. 27, 2021, the disclosures of which are incorporated herein by reference in their entirety.

BACKGROUND

The present disclosure relates to detection devices, and more specifically, to customizing algorithms based on the mounting orientation of a device.

Oftentimes sensors are arranged and mounted according to the available space in a given area. In some scenarios, fire alarms may be mounted on the ceiling of a defined space. While in others, the fire alarms may be mounted on the wall of the defined space. In today's environment, existing solutions execute the same algorithms for fire detection without considering the orientation in which the fire alarm is mounted. There may be a need to factor the position and orientation of the mounted device to optimize algorithms that are used for detecting an alarm condition.

BRIEF DESCRIPTION

According to an embodiment, a method for selecting algorithms based on mounting position and orientation of a device determining a position and orientation of a smoke detector; selecting an algorithm for performing detection of an alarm condition; and operating the smoke detector using the selected algorithm.

In addition to one or more of the features described herein, or as an alternative, further embodiments include using at least one of a wall-mounted detection settings or a ceiling-mounted detection settings, wherein the wall-mounted detection settings are different from the ceiling-mounted detection settings.

In addition to one or more of the features described herein, or as an alternative, further embodiments include determining the orientation of the detector upon initially providing power to the smoke detector.

In addition to one or more of the features described herein, or as an alternative, further embodiments include determining the orientation of the detector responsive to at least one of a detection of movement of the detector or an expiration of a configurable period of time.

In addition to one or more of the features described herein, or as an alternative, further embodiments include making a determination that is based on reading coordinate data from at least one of a 3-axis accelerometer or a gyroscope of the smoke detector.

In addition to one or more of the features described herein, or as an alternative, further embodiments include maintaining the selected algorithm until the smoke detector is powered off.

In addition to one or more of the features described herein, or as an alternative, further embodiments include responsive to determining a wall-mounted orientation, comparing the coordinate data to determine whether the smoke detector is in a most favorable position or a least favorable position.

In addition to one or more of the features described herein, or as an alternative, further embodiments include selecting the algorithm for the most favorable position or the least favorable position based on the comparison; and using the selected algorithm for the most favorable position or the least favorable position to monitor the alarm condition.

According to an embodiment, a system for selecting algorithms based on mounting position and orientation of a device. The system includes a position detection device configured to determine a position and orientation of a smoke detector; a controller coupled to the position detection device, the controller configured to select an algorithm for performing detection of an alarm condition; and a sensor coupled to the controller, the sensor is operated to detect the alarm condition using the selected algorithm.

In addition to one or more of the features described herein, or as an alternative, further embodiments include using at least one of a wall-mounted detection settings or a ceiling-mounted detection settings, wherein the wall-mounted detection settings are different from the ceiling-mounted detection settings.

In addition to one or more of the features described herein, or as an alternative, further embodiments include determining a position and orientation of the smoke detector upon initially providing power to the smoke detector.

In addition to one or more of the features described herein, or as an alternative, further embodiments include determining the orientation of the detector responsive to at least one of detection of movement of the detector or an expiration of a configurable period of time.

In addition to one or more of the features described herein, or as an alternative, further embodiments include using a determination that is based on reading coordinate data from the position detection device that is at least one of a 3-axis accelerometer or a gyroscope of the smoke detector.

In addition to one or more of the features described herein, or as an alternative, further embodiments include using a controller that is configured to maintain the selected algorithm until the smoke detector is powered off.

In addition to one or more of the features described herein, or as an alternative, further embodiments include responsive to determining a wall-mounted orientation, the controller is configured to compare the coordinate data to determine whether the smoke detector is in a most favorable position or a least favorable position.

In addition to one or more of the features described herein, or as an alternative, further embodiments include using a controller that is configured to select the algorithm for the most favorable position or the least favorable position based on the comparison; and use the selected algorithm for the most favorable position or the least favorable position to monitor the alarm condition The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Fire and smoke sources can produce different patterns. Therefore, the detection of various smoke sources and patterns should be modified to account for the position and orientation of the detector. For example, the pattern of the fire source or smoke source may be detected differently at the detector based on whether the detector is a ceiling mounted device or a wall mounted device. The paths at which the fire or smoke pattern enter the detection device can vary based on where the device is located relative to the fire or smoke source and where the device is mounted, ceiling or wall.

Figure 1:
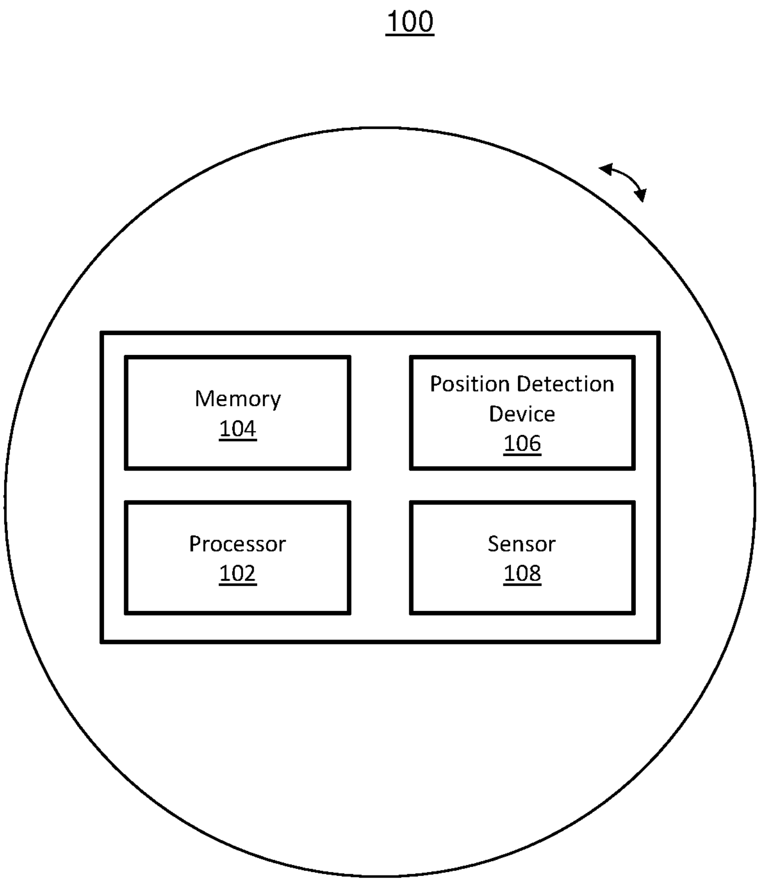
FIG. 1 depicts an example device that is used for monitoring alarm conditions in accordance with one or more embodiments of the disclosure.

FIG. 1 depicts an example device 100 for detecting a condition in accordance with one or more embodiments of the disclosure. The device 100 can be used for detecting various alarm conditions and can be mounted in various orientations. For example, the device 100 can be wall mounted or ceiling mounted. In one or more embodiments of the disclosure, the device 100 can include a processor 102 and memory 104. In one or more embodiments of the disclosure, the processor 102 can be a processor of a general-purpose computer, special purpose computer, or other programmable data processing apparatus configured to execute instruction via the processor of the computer or other programmable data processing apparatus. The memory 104 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), etc.). The device 100 can also include system on a chip (SoC) or other combination of devices. For example, embodiments can include a distributed memory, e.g., several algorithms in different memory spaces/devices or one algorithm across multiple memory spaces/devices. In one or more embodiments of the disclosure, the memory 104 can store various algorithms for the device. The algorithms can include a vertical orientation algorithm for wall-mounted devices and horizontal orientation algorithm for ceiling-mounted devices. In addition, the wall-mounted devices can include further algorithms used to monitor alarm conditions based on being arranged in the least favorable or most favorable position.

The device 100 can also include a position detection device 106. An example position detection device 106 can include an accelerometer or gyroscope. In one or more embodiments of the disclosure, a controller 110 including the processor 102 can be coupled to the position detection device 106. The position detection device 106 of the device 100 is configured to detect the x, y, z-coordinates to determine the orientation of the device 100 for which the device has been mounted. The controller 110 can be configured to select an algorithm for performing detection of an alarm condition based on the detected coordinates of the device 100.

In FIG. 1, the device 100 also includes a sensor 108. In one or more embodiments of the disclosure, the sensor 108 may be configured to detect the temperature, the pressure, the smoke, other particulates, or other conditions within its proximity. In some embodiments, the sensor 108 can include a photoelectric detector that is used to detect the presence of smoke. It should be appreciated that different sensors 108 can be used to detect various conditions and is not limited by the examples discussed herein.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 2:
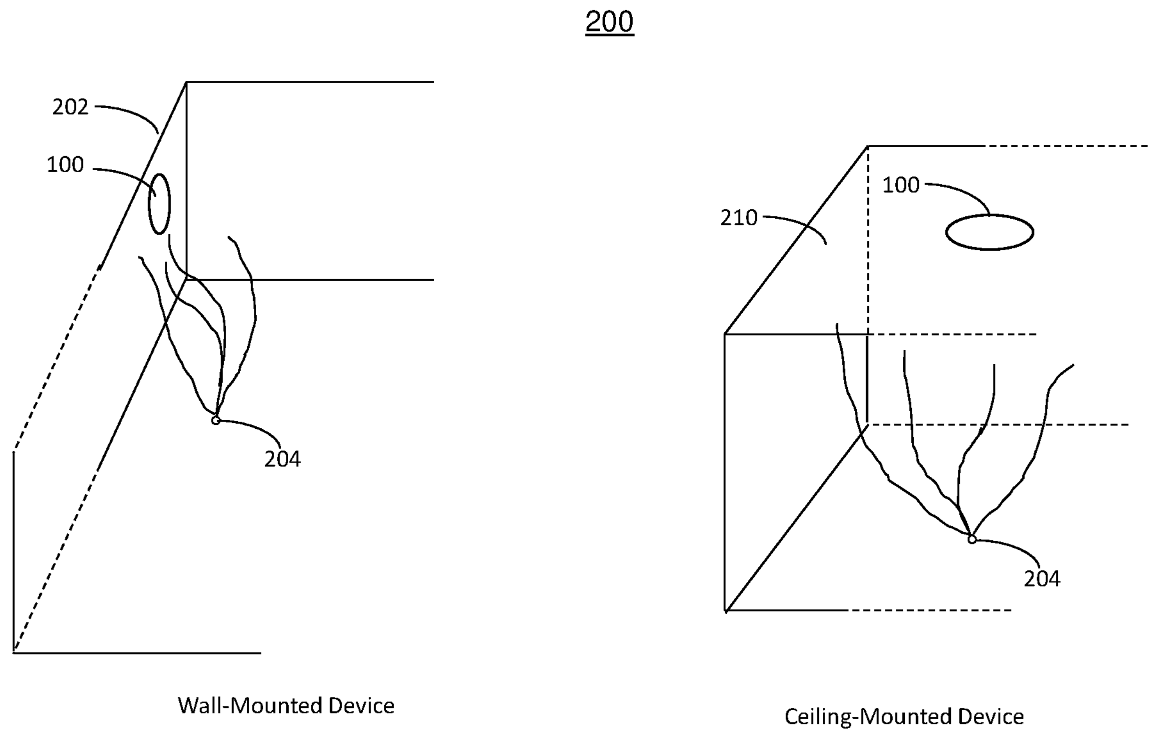
FIG. 2 depicts various arrangements of the device used for monitoring alarm conditions in accordance with one or more embodiments of the disclosure.

FIG. 2 depicts an example of a wall-mounted device 100 and a ceiling-mounted device 100 that may be used in accordance with one or more embodiments of the disclosure. In FIG. 2, the illustration shown on the left depicts a wall-mounted device 100 that has been position on the wall 202. The device 100 can be mounted on the wall 202 at various heights which can affect the performance of the detection of a condition. For example, the higher the device 100 is placed on the wall 202 the further the distance the device 100 is from the smoke source 204. This can increase the detection time from the start of an alarm condition. In this non-limiting example, the smoke source 204 is detected by the wall-mounted device 100. The wall-mounted device 100 can be positioned on the wall in a least favorable position (LFP) or a most favorable position (MFP) which is based on the rotational position of the device 100. The LFP and MFP define the directionality or rotation position of the device 100. Multiple simulations may be conducted to vary the directionality of the device 100 through a range of positions (x, y, z-coordinates) for a given smoke or fire source. The results of the simulations can log the response times to detect the alarm condition for the given fire/smoke source. Based on the response times, the sensitivity level of the device 100 can be modified. The sensitivity of the sensor 108 of the device 100 directly impacts how long it will take the sensor 108 to detect the alarm condition. The response time can be increased or decreased by decreasing or increasing the sensitivity thresholds for the device 100, respectively. The response times and sensitivity thresholds can be associated with the position of the wall-mounted device 100. The position of the wall-mounted device 100 providing the worst results (the longest time to detect the alarm condition) may be labeled the LFP. In a non-limiting example, the wall-mounted device 100 oriented in the LFP can take in less smoke and can take a longer time to detect the smoke. The position of the wall-mounted device 100 providing the best results (the shortest time to detect the alarm condition) can be labeled the MFP. In a non-limiting example, the wall-mounted device 100 oriented in the MFP can take in more smoke and can be able to detect the smoke signal faster. The technical effects and benefits of the disclosure include maintaining similar performance for the wall-mounted device regardless of its position. Therefore, the alarm condition can be indicated at approximately the same time for a given smoke source in both the LFP and MFP.

Various factors can influence the detector's ability to detect the alarm condition. For example, mechanical obstructions, a thermal block/shield, a light pipe, location of a push button to the sensor 108 can impact the path of the smoke. By rotating the device, the smoke can may have a less obstructed path to the sensor 108. For example, the LFP may be a position where the housing or structure of the device 100 is more likely to block or be an obstacle to the sensor 108 that is used to detect the alarm condition. Alternatively, the MFP can include a position where a vent in the housing or structure can allow the smoke to optimally flow towards the sensor 108 of the device 110 and be quickly detected.

The results of the simulation can be used to adjust or modify the sensitivity of the wall-mounted device 100 based on its mounted position. For example, a wall-mounted device 100 positioned in the LFP or within a threshold range of the LFP, the sensitivity of the sensor/detector of the wall-mounted device 100 can be increased to detect the alarm condition earlier.

A wall-mounted device 100 positioned in the MFP or within a threshold range of the MFP, the sensitivity of the sensor/detector of the wall-mounted device 100 can be decreased to indicate the alarm condition later. The sensitivity of the sensor(s) 106 can be fine-tuned and configured to optimally detect the conditions based on being positioned in the LFP or MFP.

The illustration shown on the right depicts an example of the device 100 that has been mounted on the ceiling 210. The position of the ceiling mounted device 100 can be determined based on the coordinates detected by the position detection device 106.

The detection of smoke by the device 100 can be determined differently in each of the scenarios. Various factors such the location of the sensor 108 or the housing of the device 100 may be an obstacle to detecting the smoke at the sensor 108. As shown in the wall-mounted device 100 scenario the smoke may become concentrated along the wall and in the ceiling-mounted device 100 scenario the smoke may be more evenly distributed. Therefore, the threshold sensitivity settings may be configured to be less sensitive in the wall-mounted scenario and the setting may be configured to be more sensitive in the ceiling mounted scenario. In some embodiments of the disclosure, the ceiling mounted device 100 can be configured with a lower threshold for detecting the alarm condition. The modification of the sensitivity threshold for LFP and MFP mounted devices 100 can reduce the indication of false alarms. Based on the determination, the settings such as the sensitivity threshold, for the sensor 108 can be further fine-tuned.

Figure 3:
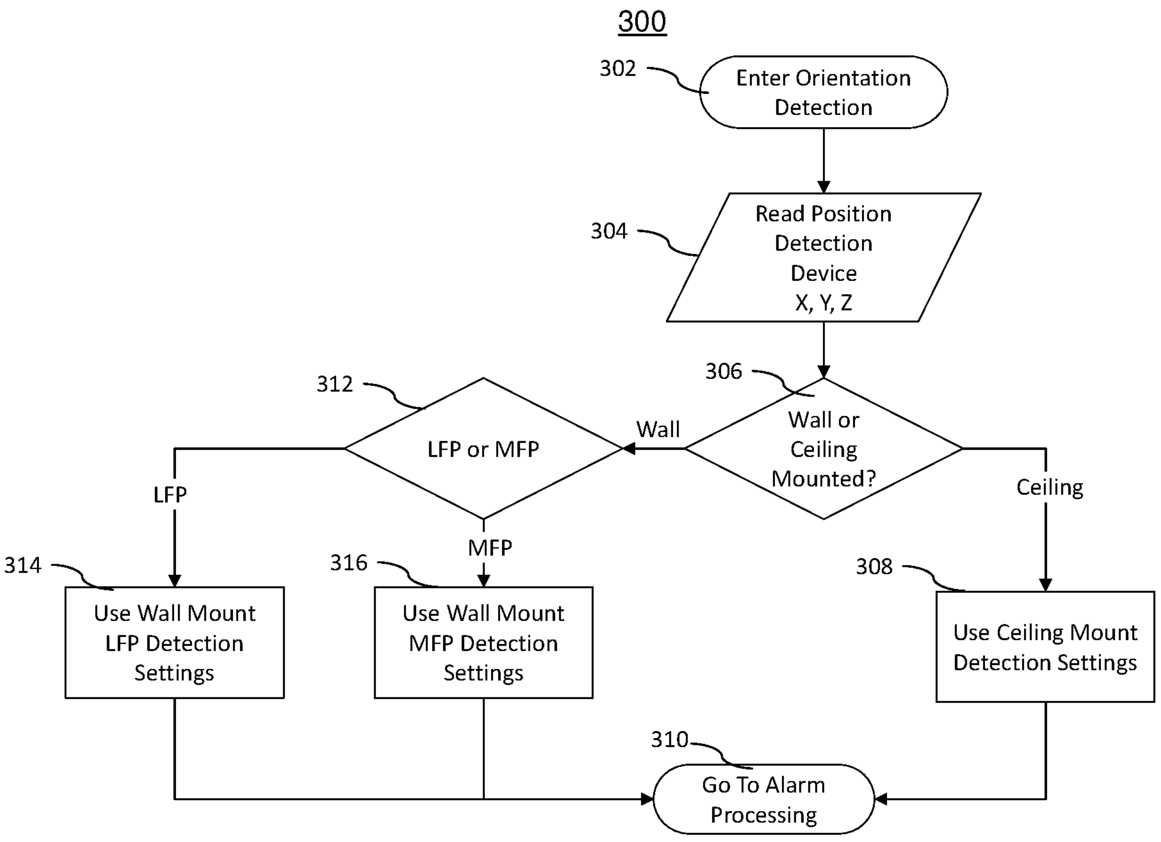
FIG. 3 depicts a flowchart of a method for customizing algorithms based on determining a mounting orientation of the device in accordance with one or more embodiments of the disclosure.

FIG. 3 depicts a flowchart of a method 300 for customizing algorithms based on the mounting orientation of a device in accordance with one or more embodiments of the disclosure. The method 300 can be implemented in a device 100 or other similar detectors. The method 300 can begin in block 302 where the device 100 is mounted to a surface. In one or more embodiments of the disclosure, the device 100 can enter an orientation determination mode to determine the correct settings for monitoring the alarm conditions. In some embodiments, the orientation of the detector is determined upon initially providing power to the smoke detector. In other embodiments, the orientation of the detector can be determined responsive to at least one of a detection of movement of the detector based on the position detector readings or an expiration of a configurable period of time. At block 304 the position detection device 106 takes a reading of its position and orientation.

At decision block 306, based on readings taken at block 304, the device 100 determines whether the device has been mounted on a wall or the ceiling. If the device 100 is determined to be mounted on the ceiling, the method 300 proceeds to block 308 and the device 100 is configured to use the ceiling mounted detection settings. The device 100 operates in the ceiling mounted detection mode and continues to monitor the conditions using the configured parameters.

If at decision block 306 it is determined based on readings that the device 100 is mounted on a wall, the method 300 proceeds to decision block 312 to determine whether the device 100 is positioned in the LFP or MFP. The device 100 can compare the coordinate data to determine whether the smoke detector is in a most favorable position or a least favorable position. It should be understood the device 100 can be positioned in any range between the LFP and MFP and is not limited thereto. For example, the device 100 can be mounted within the full possible rotation of the unit. If it is determined the device 100 is positioned in the LFP, at block 314, the device 100 uses the wall-mounted LFP detection settings and proceeds to monitor for an alarm condition using the wall-mounted LFP detection settings. If at block 312 it is determined that the device 100 is positioned in the MFP, at block 316 the device 100 will use the wall-mounted MFP detection settings. In the event the device 100 is positioned in the range between the LFP and MFP, the detection settings may be selected based on which position and orientation the device 100 is closest to. For example, if device 100 is positioned between the LFP and MFP but is closest to the MFP, the wall-mounted MFP detection settings will be used. Alternatively, if the device 100 is positioned closer to the LFP, the wall-mounted LFP detection settings will be used. In one or more embodiments, an intermediate setting can be used to granularly modify the threshold sensitivity for orientations that are between the LFP and MFP to optimize the response time of the device 100. In a non-limiting example, the intermediate setting can provide a threshold that is the average of the LFP and MFP thresholds. The intermediate settings can also be configured to a different threshold is not limited by the example. It should be understood that other criteria can be used to select the detection settings and is not limited to the examples discussed herein. Next, the method 300 will proceed to block 310 to continue to monitor for an alarm condition using the wall-mounted MFP detection settings. In one or more embodiments of the disclosure, the selected algorithm/detection settings are maintained until the smoke detector is powered off.

The technical effects and benefits include mapping the orientation (x, y, z-coordinates) of a mounted device to configuration settings to optimally select the sensitivity thresholds for the detection devices. A custom algorithm can be utilized for wall-mounted devices and another customized algorithm for ceiling-mounted devices which can provide optimized sensitivity thresholds for smoke detection. The optimized settings can reduce the number of nuisance alarms detected by the device. In addition, the technical effects and benefits can include leveraging the orientation of the wall-mounted devices relative to the most favorable and least favorable positions to normalize the detector's performance to improve reliability.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for selecting an algorithm for monitoring alarm conditions based on a detector orientation and position, the method comprising:

determining a position and orientation of a smoke detector;

selecting an algorithm for performing detection of an alarm condition; and operating the smoke detector using the selected algorithm.

2. The method of claim 1, wherein the algorithm comprises at least one of a wall-mounted detection settings or a ceiling-mounted detection settings, wherein the wall-mounted detection settings are different from the ceiling-mounted detection settings.

3. The method of claim 1, further comprising determining the orientation of the detector upon initially providing power to the smoke detector.

4. The method of claim 1, further comprising determining the orientation of the detector responsive to at least one of a detection of movement of the detector or an expiration of a configurable period of time.

5. The method of claim 1, wherein the determination is based on reading coordinate data from at least one of a 3-axis accelerometer or a gyroscope of the smoke detector.

6. The method of claim 2, further comprising maintaining the selected algorithm until the smoke detector is powered off.

7. The method of claim 5, responsive to determining a wall-mounted orientation, comparing the coordinate data to determine whether the smoke detector is in a most favorable position or a least favorable position.

8. The method of claim 7, further comprising selecting the algorithm for the most favorable position or the least favorable position based on the comparison; and using the selected algorithm for the most favorable position or the least favorable position to monitor the alarm condition.

9. A system for selecting an algorithm for monitoring alarm conditions based on a detector orientation and position, the system comprising:

a position detection device configured to determine a position and orientation of a smoke detector;

a controller coupled to the position detection device, the controller configured to select an algorithm for performing detection of an alarm condition; and a sensor coupled to the controller, the sensor is operated to detect the alarm condition using the selected algorithm.

10. The system of claim 9, wherein the algorithm comprises at least one of a wall-mounted detection settings or a ceiling-mounted detection settings, wherein the wall-mounted detection settings are different from the ceiling-mounted detection settings.

11. The system of claim 10, wherein the controller is configured to maintain the selected algorithm until the smoke detector is powered off.

12. The system of claim 9, wherein the position and orientation of the smoke detector is determined upon initially providing power to the smoke detector.

13. The system of claim 9, further comprising determining the orientation of the detector responsive to at least one of detection of movement of the detector or an expiration of a configurable period of time.

14. The system of claim 9, wherein the determination is based on reading coordinate data from the position detection device that is at least one of a 3-axis accelerometer or a gyroscope of the smoke detector.

15. The system of claim 14, responsive to determining a wall-mounted orientation, the controller is configured to compare the coordinate data to determine whether the smoke detector is in a most favorable position or a least favorable position.

16. The system of claim 15, further comprising the controller is configured to select the algorithm for the most favorable position or the least favorable position based on the comparison; and use the selected algorithm for the most favorable position or the least favorable position to monitor the alarm condition.

* * * * *